United States Patent
Hongo et al.

(10) Patent No.: US 12,378,051 B2
(45) Date of Patent: Aug. 5, 2025

(54) PACKAGING BAG

(71) Applicants: TOYO SEIKAN CO., LTD., Tokyo (JP); TOYO SEIKAN GROUP HOLDINGS, LTD., Tokyo (JP)

(72) Inventors: Masahiro Hongo, Yokohama (JP); Takahiro Kurosawa, Yokohama (JP); Takashi Miura, Yokohama (JP); Kazuaki Ohashi, Yokohama (JP); Yoshiyuki Yuasa, Yokohama (JP); Takahiro Akahane, Yokohama (JP)

(73) Assignees: TOYO SEIKAN CO., LTD., Tokyo (JP); TOYO SEIKAN GROUP HOLDINGS, LTD., Tokyo (JP)

( * ) Notice: Subject to any disclaimer, the term of this patent is extended or adjusted under 35 U.S.C. 154(b) by 607 days.

(21) Appl. No.: 17/414,202

(22) PCT Filed: Dec. 5, 2019

(86) PCT No.: PCT/JP2019/047555
§ 371 (c)(1),
(2) Date: Jun. 15, 2021

(87) PCT Pub. No.: WO2020/129662
PCT Pub. Date: Jun. 25, 2020

(65) Prior Publication Data
US 2022/0024660 A1    Jan. 27, 2022

(30) Foreign Application Priority Data

Dec. 17, 2018   (JP) .................................. 2018-235672
Jan. 30, 2019   (JP) .................................. 2019-014090

(51) Int. Cl.
    *B65D 65/40*    (2006.01)
    *B32B 1/00*     (2024.01)
(Continued)

(52) U.S. Cl.
    CPC ................ *B65D 65/40* (2013.01); *B32B 1/00* (2013.01); *B32B 7/12* (2013.01); *B32B 27/08* (2013.01);
    (Continued)

(58) Field of Classification Search
    CPC .................. B65D 65/40; B65D 75/008; B65D 75/5805; B65D 2581/3428; B32B 1/00;
    (Continued)

(56) References Cited

U.S. PATENT DOCUMENTS

2006/0175325 A1   8/2006  Day
2018/0186948 A1   7/2018  Yajima et al.
(Continued)

FOREIGN PATENT DOCUMENTS

CN    203410812 U    1/2014
CN    107531381 A    1/2018
(Continued)

OTHER PUBLICATIONS

English machine translation for JP2006-143223. (Year: 2006).*
(Continued)

*Primary Examiner* — Michael C Miggins
(74) *Attorney, Agent, or Firm* — Sughrue Mion, PLLC

(57) ABSTRACT

A packaging bag including a polyester-based multilayer film. The multilayer film includes at least: an innermost layer formed of a biaxially stretched polyethylene terephthalate film; a layer formed of polybutylene terephthalate; and/or a layer formed of a blend of polyethylene terephthalate and polybutylene terephthalate. The biaxially stretched polyethylene terephthalate film has a heat sealing portion that is amorphized or low-crystallized by laser light irradiation. The packaging bag is formed by allowing the innermost
(Continued)

layers of the polyester-based multilayer film to be opposed to and superimposed on each other, and heat sealing the heat sealing portions.

7 Claims, 2 Drawing Sheets

(51) Int. Cl.
    *B32B 7/12*     (2006.01)
    *B32B 27/08*     (2006.01)
    *B32B 27/36*     (2006.01)
    *B65D 75/00*     (2006.01)
    *B65D 75/58*     (2006.01)
    *B65D 81/34*     (2006.01)

(52) U.S. Cl.
    CPC ............ *B32B 27/36* (2013.01); *B65D 75/008* (2013.01); *B65D 75/5805* (2013.01); *B65D 81/3461* (2013.01); *B32B 2250/03* (2013.01); *B32B 2250/244* (2013.01); *B32B 2255/10* (2013.01); *B32B 2255/20* (2013.01); *B32B 2270/00* (2013.01); *B32B 2307/31* (2013.01); *B32B 2307/518* (2013.01); *B32B 2439/46* (2013.01); *B32B 2439/70* (2013.01); *B65D 2581/3428* (2013.01)

(58) Field of Classification Search
    CPC ........... B32B 7/12; B32B 27/08; B32B 27/36; B32B 2250/03; B32B 2250/244; B32B 2255/10; B32B 2255/20; B32B 2270/00; B32B 2307/31; B32B 2307/518; B32B 2439/70; B32B 2439/46
    See application file for complete search history.

(56) References Cited

U.S. PATENT DOCUMENTS

2018/0311938 A1    11/2018    Murase et al.
2020/0156359 A1    5/2020    Goto

FOREIGN PATENT DOCUMENTS

| | | | | |
|---|---|---|---|---|
| EP | 0835899 | A1 * | 4/1998 | ................ C08J 5/18 |
| EP | 1595816 | A1 * | 11/2005 | ............ B65D 75/12 |
| JP | 3-218830 | A | 9/1991 | |
| JP | 4-211937 | A | 8/1992 | |
| JP | 7-285559 | A | 10/1995 | |
| JP | 10-167287 | A | 6/1998 | |
| JP | 10-287361 | A | 10/1998 | |
| JP | 11-20072 | A | 1/1999 | |
| JP | 11-240543 | A | 9/1999 | |
| JP | 2003-054580 | A | 2/2003 | |
| JP | 2006-143223 | A | 6/2006 | |
| JP | 2009-137610 | A | 6/2009 | |
| JP | 2012-214248 | A | 11/2012 | |
| JP | 2014-151945 | A | 8/2014 | |
| JP | 2016-088611 | A | 5/2016 | |
| JP | 2017-043399 | A | 3/2017 | |
| JP | 2017-043406 | A | 3/2017 | |
| JP | 2017-132517 | A | 8/2017 | |
| JP | 2018-001730 | A | 1/2018 | |
| JP | 2018-8705 | A | 1/2018 | |
| JP | 2018-20844 | A | 2/2018 | |
| JP | 2018-87028 | A | 6/2018 | |
| JP | 2018-167906 | A | 11/2018 | |
| JP | 2019-137456 | A | 8/2019 | |

OTHER PUBLICATIONS

English machine translation for JP2007106497. (Year: 2007).*
Notice of Reasons for Refusal issued Jan. 24, 2023 in corresponding Japanese Application No. 2018- 235672.
Extended European Search Report dated Aug. 10, 2022, issued in European Application No. 19899416.2.
Office Action dated Aug. 23, 2022, issued in Chinese Application No. 201980083554.3.
Japanese Office Action dated Mar. 1, 2023 in corresponding Japanese Application No. 2019-014090.
International Search Report for PCT/JP2019/047555 dated Feb. 25, 2020 [PCT/ISA/210].

* cited by examiner

PACKAGING BAG

CROSS REFERENCE TO RELATED APPLICATIONS

This application is a National Stage of International Application No. PCT/JP2019/047555 filed Dec. 5, 2019, claiming priority based on Japanese Patent Application Nos. 2018-235672 filed Dec. 17, 2018 and 2019-014090 filed Jan. 30, 2019.

TECHNICAL FIELD

The present invention relates to a packaging bag. More specifically, the present invention relates to a packaging bag that is excellent in heat resistance and mechanical strength and is suitable for use in microwave heating. The packaging bag is formed of a multilayer film having an innermost layer that is formed of a biaxially stretched polyester resin and is imparted with heat sealing properties by laser light irradiation.

BACKGROUND ART

Various propositions have been made conventionally for packaging bags to be filled with contents such as food and then sealed that are put in microwave at mealtimes. Since packaged food is heated in an unopened state, heating increases the inner pressure and also generates heat in the contents. Thus, such packaging bags are required to have heat resistance and mechanical strength.

Usually, a packaging bag for use in microwave heating employs a multilayer film including a substrate layer of a polyester resin and a heat sealing innermost layer of an olefin-based resin such as polypropylene. Such a packaging bag has satisfactory heat resistance for normal use. However, since an olefin-based resin has a lower melting point than a polyester resin, this packaging bag is not satisfactory enough for applications requiring higher heat resistance, such as a case where viscous food with a large amount of oil and salt content is to be contained and a case where high-power microwave heating or the like is intended.

A packaging bag using a polyester resin for a heat sealing innermost layer also has been known. For example, Patent Document 1 as shown below proposes a packaging bag formed of a single film or a laminate including a polyethylene terephthalate film as a substrate. On one surface of the polyethylene terephthalate film, a sealant layer imparted with heat sealing properties by laser light irradiation is provided. The sealant layers are opposed to and superposed on each other, and then heat sealed, thereby forming the packaging bag.

Further, Patent Document 2 as shown below proposes a laminate including a barrier film on its surface. The barrier film includes, in order from the surface of the laminate, a heat sealing polyester layer containing biaxially stretched polyester, and a vapor deposition layer formed on the polyester layer as a substrate.

As for a packaging bag formed of a multilayer film, it is also required to allow a user to open the packaging bag by hand without using scissors or the like when taking out the contents. There has been known a packaging bag provided with a slit that is formed by, for example, half-cutting a film in advance halfway in the thickness direction so as to allow easy manual opening.

Such a slit is usually formed in one of the films constituting the multilayer film. Accordingly, a package cannot be opened easily unless the multilayer film constituting the package is cut integrally.

In order to solve the aforementioned problem, it has been proposed to increase the laminate strength of the multilayer film to prevent delamination of the multilayer film at the time of manual opening, so that the multilayer film is cut integrally (Patent Document 3).

Further, Patent Document 4 as shown below proposes a pouch formed of a laminate film including at least a thermoplastic resin layer as an outermost layer and a sealant layer as an innermost layer. This pouch is characterized in that a tear-open part of the pouch formed of the laminate film is subjected to thermal compression at a temperature not lower than the glass transition point of the thermoplastic resin layer.

PRIOR ART DOCUMENTS

Patent Documents

Patent Document 1: JP 2017-43399 A
Patent Document 2: JP 2018-1730 A
Patent Document 3: JP 2003-54580 A
Patent Document 4: JP 2016-88611 A

SUMMARY OF THE INVENTION

Problems to be Solved by the Invention

The packaging bag described in each of Patent Documents 1 and 2 is formed using polyethylene terephthalate also for the heat seal layer. Thus, it is superior in gas barrier properties and heat resistance to a packaging bag containing an olefin-based resin.

However, since this packaging bag is formed only of polyethylene terephthalate, it lacks flexibility and may be broken when being subjected to drop impact or bent.

Further, the films constituting the multilayer film may include a biaxially stretched film. In such a case, even when the film constituting the multilayer film is slit, the multilayer film may not be cut in the same direction as that of the slit film being torn, due to the orientation of the biaxially stretched film. As a result, the biaxially stretched film is delaminated from the slit film, so that the package cannot be cut integrally along the slit. Thus, it is impossible to achieve satisfactory easy openability.

Therefore, an object of the present invention is to provide a polyester packaging bag suitable for use in microwave heating. The packaging bag is excellent in heat resistance and mechanical strength, has required flexibility, and is also excellent in impact resistance.

Another object of the present invention is to provide a packaging bag formed of a multilayer film including an intermediate layer with a slit. The packaging bag has excellent easy openability that allows the multilayer film constituting the packaging bag to be cut integrally without the use of a tool such as scissors.

Means for Solving the Problems

The present invention provides a packaging bag including a polyester-based multilayer film, the multilayer film including at least: an innermost layer formed of a biaxially stretched polyethylene terephthalate film; a layer formed of polybutylene terephthalate; and/or a layer formed of a blend of polyethylene terephthalate and polybutylene terephthalate. The biaxially stretched polyethylene terephthalate film has a heat sealing portion that is amorphized or low-crystallized by laser light irradiation, and the packaging bag is formed by: allowing the innermost layers of the polyester-based multilayer film to be opposed to and superimposed on each other; and heat sealing the heat sealing portions.

It is suitable in a first packaging bag of the present invention that:
1. the polyester-based multilayer film further includes a layer formed of a polyethylene terephthalate film;
2. the layer formed of a polyethylene terephthalate film is an outermost layer that is formed of biaxially stretched polyethylene terephthalate and has an easy-opening portion that is amorphized or low-crystallized by laser light irradiation, and an intermediate layer located between the outermost layer and the innermost layer has a slit;
3. in the multilayer film, a position where the slit is formed matches a position where the easy-opening portion is formed;
4. the intermediate layer is formed of polybutylene terephthalate and/or polyethylene terephthalate;
5. either of the layers except for the innermost layer is a film on which an inorganic vapor deposition layer or a barrier coating layer is formed;
6. the polyester-based multilayer film has a layer configuration in which a layer formed of a polyethylene terephthalate film/a vapor deposition layer or a barrier coating layer/a layer formed of a polybutylene terephthalate film or a blend of polyethylene terephthalate and polybutylene terephthalate/and the innermost layer formed of a biaxially stretched polyethylene terephthalate film are laminated in order from the outer layer; and
7. the polyester-based multilayer film has a layer configuration in which a layer formed of a polybutylene terephthalate film or a blend of polyethylene terephthalate and polybutylene terephthalate/a vapor deposition layer or a barrier coating layer/a layer formed of a polyethylene terephthalate film or a blend of polyethylene terephthalate and polybutylene terephthalate/and the innermost layer formed of a biaxially stretched polyethylene terephthalate film are laminated in order from the outer layer.

The present invention also provides a packaging bag including a multilayer film, the multilayer film including at least: an outermost layer formed of a biaxially stretched polyethylene terephthalate film; an intermediate layer formed of a film with a slit; and an innermost layer formed of a heat sealable resin film. The biaxially stretched polyethylene terephthalate film has an easy-opening portion that is amorphized or low-crystallized by laser light irradiation.

It is suitable in a second packaging bag of the present invention that:
1. in the multilayer film, a position where the slit is formed matches a position where the easy-opening portion is formed; and
2. the intermediate layer is formed of either nylon, polybutylene terephthalate, or polyethylene terephthalate.

Effects of the Invention

According to the packaging bag of the present invention, all the layers including the heat seal layer are formed of a polyester resin, thereby exhibiting excellent heat resistance and moisture barrier properties. Further, the packaging bag is provided with the layer formed of polyethylene terephthalate (hereinafter, referred to as "PET") as well as the layer containing polybutylene terephthalate (hereinafter, referred to as "PBT") which has high tensile elasticity and flexibility, thereby remarkably increasing mechanical strength of the packaging bag.

Further, a biaxially stretched PET film is used for the heat seal layer as the innermost layer, thereby effectively suppressing adsorption of the flavor of the contents or the like and preventing, for example, the formation of a hole even when viscous food with a large amount of salt and oil content is contained.

Furthermore, the packaging bag of the present invention has remarkably excellent heat resistance, and thus it is adaptable to high-power microwave heating and also to heat sterilization under high temperature and humidity conditions, such as retort sterilization, regardless of the type of the contents.

In a case where a biaxially stretched PET film is used for the outermost layer, an amorphized or low-crystallized easy-opening portion is formed in the biaxially stretched PET film. This enables the biaxially stretched PET film to be torn regardless of its orientation direction. Accordingly, it becomes possible to tear the biaxially stretched PET film in a direction matching the direction of the slit line formed in the intermediate layer. Therefore, the multilayer film constituting the packaging bag can be torn easily and integrally.

MODE FOR CARRYING OUT THE INVENTION

Figure 1:
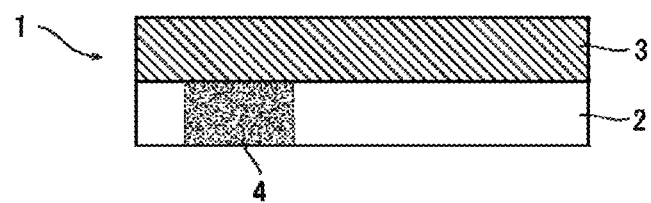
FIG. 1: a diagram showing an example of the layer configuration of a multilayer film constituting a packaging bag of the present invention.

It is important that a packaging bag of the present invention is formed of a polyester-based multilayer film including at least an innermost layer formed of a biaxially stretched PET film, a layer formed of PBT and/or a layer formed of a blend of PET and PBT.

Namely, as described above, all the layers including a heat seal layer are formed of a polyester resin. This results in remarkably excellent heat resistance, barrier properties, and mechanical strength as compared with a conventional packaging bag having a heat seal layer formed of an olefin-based resin.

Further, not only PET but also PBT which has high tensile elasticity and excellent flexibility are used for the layers. Thus, it is possible to achieve impact resistance that prevents the packaging bag from being broken even by drop impact or the like.

Furthermore, a biaxially stretched PET film is used for the innermost layer. This remarkably increases contents resistance and flavor resistance.

A first packaging bag of the present invention is characterized in that biaxially stretched PET is irradiated with a laser light, so that an amorphized or low-crystallized heat sealing portion is formed.

While a polyester resin that is oriented and crystallized by biaxial stretching has the aforementioned excellent properties, it lacks heat sealing properties. On this account, laser light irradiation is performed to partially form a heat sealing portion, thereby imparting heat sealing properties that enable the formation of a packaging bag to the biaxially stretched PET without impairing its excellent properties.

Further, an intermediate layer is slit so as to enable tearing along the formed slit. As described above, however, when the outermost layer is formed of biaxially stretched PET, the outermost layer is not necessarily torn in the same direction as the direction in which the intermediate layer is intended to be torn, due to the biaxial stretching orientation. As a result, the outermost layer and the intermediate layer may be torn in different directions.

According to the present invention, a part of the outermost layer formed of a biaxially stretched PET film is irradiated with a laser light, so that the irradiated part is amorphized or low-crystallized to be brittle, thereby forming an easy-opening portion. The easy-opening portion is determined to be located to match the position of the slit formed in the intermediate layer. This allows the easy-opening portion to be torn simultaneously with tearing of the intermediate layer along the slit, and thus enables the entire multilayer film constituting the packaging bag to be cut integrally and easily.

In the present specification, the term "biaxially stretched film" refers to only a film that is biaxially stretched. Meanwhile, a film without the modifier of "biaxially stretched" refers to not only an unstretched film but also a stretched film.

(Multilayer Film)

A multilayer film to be used for a packaging bag of the present invention will be described with reference to the attached drawings.

A multilayer film 1 shown in FIG. 1 includes an innermost layer 2 formed of a biaxially stretched PET film and a substrate layer 3 that serves as an outermost layer. The substrate layer 3 is formed of a layer made only of PBT (hereinafter, referred to as a "PBT layer"), or a layer made of a blend of PBT and PET (hereinafter, referred to as a "PBT-PET layer"). On the inner surface of the innermost layer 2 formed of a biaxially stretched PET film, a heat sealing portion 4 that is amorphized or low-crystallized by laser light irradiation is formed.

Figure 2:
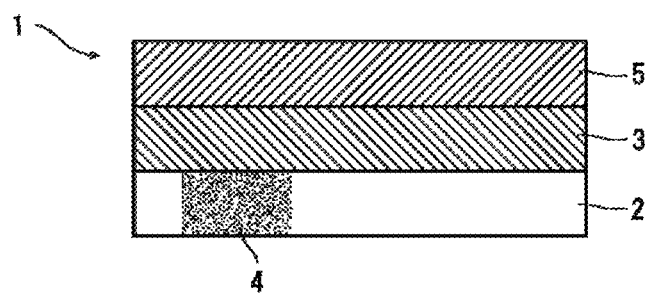
FIG. 2: a diagram showing another example of the layer configuration of the multilayer film constituting the packaging bag of the present invention.

A multilayer film 1 shown in FIG. 2 is different from the multilayer film shown in FIG. 1 in that an outermost layer 5 is further formed on the outer face side of the substrate layer 3. In a case where the substrate layer is formed of a PBT layer as described above, the outermost layer 5 is preferably a layer made only of PET (hereinafter, referred to as a "PET layer") or a PBT-PET layer. In a case where the substrate layer 3 is formed of a PET layer, the outermost layer 5 is preferably formed of a PBT-PET layer or a PBT layer. The outermost layer 5 may be an unstretched film formed by extrusion coating but is suitably a biaxially stretched film. By further providing a biaxially stretched film which is excellent in heat resistance, mechanical strength and the like, these properties are improved further. In the specific example shown in FIG. 2, the PET layer, the PBT layer or the PBT-PET layer is formed as the outermost layer; however it may be formed between the substrate layer 3 and the innermost layer 2.

Figure 3:
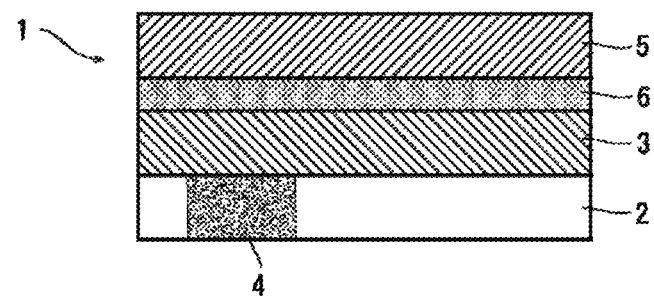
FIG. 3: a diagram showing still another example of the layer configuration of the multilayer film constituting the packaging bag of the present invention.

A multilayer film 1 shown in FIG. 3 is different from the multilayer film shown in FIG. 1 in that a barrier layer 6 formed of a vapor deposition layer or a barrier coating layer is formed on the substrate layer 3, and a PET or PBT layer 5 is formed to cover the barrier layer 6. It is suitable also in this configuration that the substrate layer and the outermost layer are formed of the combination of a PET layer and a PBT layer as in the case shown in FIG. 2. Each of the outermost layer and the substrate layer may be a biaxially stretched film.

In the present invention, each of the layer configurations shown in FIGS. 2 and 3 can be further added with a PET layer that is laminated as an outermost layer and/or an intermediate layer.

Figure 4:
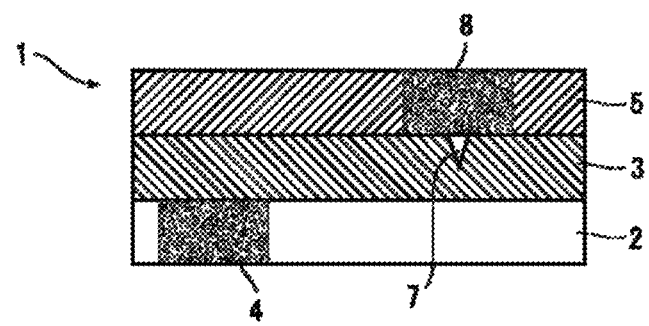
FIG. 4: a diagram showing an example of a multilayer film obtained by imparting easy openability to the multilayer film shown in FIG. 2.

A multilayer film shown in FIG. 4 is based on the multilayer film shown in FIG. 2. This multilayer film includes an outermost layer 5 formed of a biaxially stretched film, a substrate layer (intermediate layer) 3, and an innermost layer 2 having a heat sealing portion 4. In the outermost layer 5, an easy-opening portion 8 that is amorphized or low-crystallized by laser irradiation is formed, and the substrate layer (intermediate layer) 3 is slit to have a slit 7.

Figure 5:
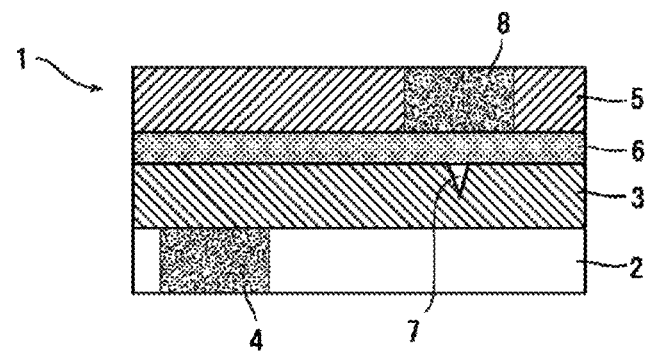
FIG. 5: a diagram showing an example of a multilayer film obtained by imparting easy openability to the multilayer film shown in FIG. 3.

A multilayer film in a specific example shown in FIG. 5 is different from the multilayer film shown in FIG. 4 in that a barrier layer 6 formed of a vapor deposition layer or a barrier coating layer is formed on the inner face side of a biaxially stretched PET film constituting the outermost layer 5. This makes it possible to provide a packaging bag with increased barrier properties.

In a case where the intermediate layer of the multilayer film used in the present invention is slit, it is particularly preferable that the intermediate layer is formed of polyester such as PET, PBT, an ethylene terephthalate-butylene terephthalate copolymer, or a blend of PET and PBT, or nylon. Among them, PBT or a blend of PBT and PET can be used suitably. More specifically, PBT, nylon and the like are excellent in impact resistance, and thus capable of effectively preventing, for example, breakage of a packaging bag due to drop impact. However, nylon is inferior in moisture barrier properties under high humidity conditions such as retort sterilization. On this account, when retort sterilization is intended, PBT or a blend of PBT and PET can be used suitably.

In the multilayer film to be used for a packaging bag of the present invention, it is suitable that the substrate layer (intermediate layer) has a thickness in a range of 5 to 50 μm, and particularly in a rage of 10 to 30 μm from the viewpoint of impact resistance, slit workability and the like, though it depends on the layer configuration and the resin used. Further, the biaxially stretched PET film that serves as the innermost layer having the heat sealing portion suitably has a thickness in a range of 5 to 50 μm. In a case of further forming a PET film, a film made of a blend of PET and PBT, a PBT film, or a biaxially stretched film thereof, such a film suitably has a thickness of 5 to 50 μm. Further, the multilayer film as a whole suitably has a thickness in a range of 20 to 100 μm.

Further, the PET film to form the outermost layer is preferably biaxially stretched. This serves to remarkably increase heat resistance and mechanical strength. As for the draw ratio, the PET film suitably has an areal draw ratio in a range of 3 to 6 times, though the present invention is not limited thereto. It is suitable that the biaxially stretched PET film that serves as the outermost layer has a thickness in a range of 5 to 50 μm, particularly 10 to 30 μm from the viewpoint of mechanical strength of a packaging bag and the like.

Here, PET used in the multilayer film is polyester composed mainly of ethylene terephthalate in which 80 mol % or more of a dicarboxylic acid component is a terephthalic acid component, and 80% or more of an alcohol component is an ethylene glycol component. Further, PBT is polyester in which 80 mol % or more of a dicarboxylic acid component is terephthalic acid, and 80 mol % or more of an alcohol component is 1,4-butanediol. Each of PET and PBT may be homopolyester or copolymerized polyester.

Examples of the carboxylic acid component other than the terephthalic acid component include isophthalic acid, naphthalenedicarboxylic acid, p-β-oxyethoxybenzoic acid, biphenyl-4,4'-dicarboxylic acid, diphenoxyethane-4,4'-dicarboxylic acid, 5-sodium sulfoisophthalic acid, hexahydroterephthalic acid, adipic acid, sebacic acid, trimellitic acid, and pyromellitic acid.

Examples of the alcohol component other than ethylene glycol and 1,4-butanediol include propylene glycol, neopentyl glycol, 1,6-hexylene glycol, diethylene glycol, triethylene glycol, cyclohexane dimethanol, a bisphenol A-ethylene oxide adduct, glycerol, trimethylolpropane, pentaerythritol, dipentaerythritol, and sorbitan.

It is desirable that the blend ratio (mass ratio) of PET to PBT in the blend is in a range of 10:90 to 90:10, particularly 49:51 to 20:80.

The layers other than the innermost layer may contain a conventionally known compounding agent for resins, such as a lubricant, an antiblocking agent, a filler, an antioxidant, a colorant, or an antistatic agent, in accordance with a well-known formulation.

Each of PET and PBT to be used is required to have a molecular weight that enables film formation. From the viewpoint of mechanical strength, it is favorable that each of PET and PBT has an intrinsic viscosity of 0.5 dL/g or more, particularly in a range of 0.55 to 0.70 dL/g. Here, the intrinsic viscosity is measured by using a mixed solvent of phenol and tetrachloroethane.

Examples of the inorganic vapor deposition layer that is formed on the layer other than the innermost layer, i.e., the substrate layer, the PET layer, the PBT layer, or the PBT-PET layer, include: inorganic oxide vapor deposition layers as typified by a metal oxide vapor deposition layer such as an aluminum oxide vapor deposition layer, and a silicon oxide vapor deposition layer; and a hydrocarbon-based vapor deposition layer such as a diamond-like carbon vapor deposition layer. Examples of the barrier coating layer include a coating barrier layer applied with a coating agent made of a compound having a metalloxane bond by a hydrolyzed compound such as a metal alkoxide compound or a metal halogen compound, and a coating barrier layer applied with a coating agent made of a gas barrier resin such as a polyvinyl alcohol-based polymer or a polycarboxylic acid-based polymer.

Specific examples of the multilayer film to be used for a packaging bag of the present invention will be described below, though the present invention is not limited to the following examples. Here, the layers are recited in order from an outer layer to an inner layer. As described above, the PET layer refers to a layer formed only of PET; the PBT layer refers to a layer formed only of PBT; the PBT-PET layer refers to a layer formed of a blend of PBT and PET; and the barrier layer refers to a vapor deposition layer or a barrier coating layer. Examples include:

biaxially stretched or unstretched PET layer/barrier layer/PBT layer or PBT-PET layer/biaxially stretched PET film;

biaxially stretched or unstretched PET layer/PBT layer or PBT-PET layer/barrier layer/biaxially stretched PET film;

biaxially stretched or unstretched PET layer/PBT layer or PBT-PET layer/barrier layer/PBT layer or PBT-PET layer/biaxially stretched PET film;

biaxially stretched or unstretched PBT layer/biaxially stretched PET film;

biaxially stretched or unstretched PBT layer/barrier layer/PET layer or PBT-PET layer/biaxially stretched PET film;

biaxially stretched or unstretched PBT layer/PET layer or PBT-PET layer/barrier layer/biaxially stretched PET film; and biaxially stretched or unstretched PBT layer/PET layer or PBT-PET layer/barrier layer/PET layer or PBT-PET layer/biaxially stretched PET film.

As described above, the biaxially stretched PET film constituting the innermost layer of the multilayer film is irradiated with a laser light so that the irradiated portion is amorphized or low-crystallized, thereby achieving heat sealing properties.

It is preferable that the amorphized or low-crystallized portion provided in the innermost layer has a width of 1 to 10 mm, particularly 2 to 6 mm, though it can be changed arbitrarily depending on a heat seal part to be formed. Even in a case of forming the heat seal part that is as small in width as above, the heat sealing portion formed by laser light irradiation is capable of imparting excellent sealing reliability with a sealing strength of not less than 10 N/15 mm width to the heat seal part. Further, by making the width of the heat seal part as small as 5 mm or less, the heat seal part can be imparted with easy openability. The amorphized or low-crystallized portion can be provided at a site to be heat sealed as a single line or as a combination of a plurality of lines formed at small intervals.

As described above, it is desirable in the present invention that the innermost layer is formed of a biaxially stretched PET film, which is irradiated with a laser light, so that the amorphized or low-crystallized heat sealing portion is formed, because this enables the entire multilayer film to be formed of polyester and thus imparts excellent heat resistance to a packaging bag. However, as for a second packaging bag in which heat resistance barely matters, the innermost layer also can be formed of a conventionally known heat sealing resin like polyolefin such as polypropylene or polyethylene.

In a case of using a multilayer film in which the outermost layer is formed of a biaxially stretched PET film, and the intermediate layer is slit, the outermost layer is irradiated with a laser light, so that an amorphized or low-crystallized easy-opening portion is formed.

The position, area and the like of the easy-opening portion formed in the outermost layer by laser light irradiation can be changed as appropriate as long as the easy-opening portion can be broken simultaneously with breaking of the slit formed in the intermediate layer. However, the easy-opening portion is suitably formed at a position that matches the slit. As described later with reference to FIG. 6, the easy-opening portion can be formed continuously so as to embrace the slit, or alternatively may be formed as a plurality of spots so as to embrace a part of the slit.

The amorphized or low-crystallized easy-opening portion suitably has a thickness in a range of 50% to 100% of the thickness of the biaxially stretched PET film, from the viewpoint of easy openability.

In a case of providing the innermost layer with the amorphized or low-crystallized portion at a site to be heat sealed, and a case of providing the outermost layer with the amorphized or low-crystallized easy-opening portion, scanning irradiation of an infrared wavelength carbon dioxide laser or the like is performed on a very limited site that extends halfway in the thickness direction from the surface of the PET film that is oriented and crystallized by biaxial orientation. The PET film is heated rapidly in a short time to a temperature not lower than the melting point. At the time when heating is stopped, the PET film is quenched rapidly to a temperature lower than the crystallization temperature. In this manner, the amorphized or low-crystallized portion is formed.

The thickness of the amorphized or low-crystallized portion can be controlled by changing the output and scanning speed of the laser beam. Also, by changing the spot diameter and spot shape of the laser beam, the width and shape of the amorphized or low-crystallized portion can be controlled.

The conditions of scanning irradiation of an infrared laser light vary depending on the composition, draw ratio, thickness and the like of the stretched polyester on the surface. In particular, from the viewpoint of avoiding extremely high output, it is preferable to select from the following conditions.

Output: 10 to 400 W, particularly 30 to 400 W
Spot diameter: 0.14 to 15 mm
Scanning line interval: 0.05 to 15 mm
Irradiation energy density: 0.5 to 8 J/cm$^2$ The slit (half-cut) in the intermediate layer can be formed by a conventionally known method such as using a cutting blade or laser irradiation. For example, JP 2018-86695 A, which is filed by the present applicant, describes slitting a film surface using a work roll provided with a cutting blade. This method or the like can be used suitably, though the present invention is not limited thereto.

The multilayer film to be used for a packaging bag of the present invention can be produced by a conventionally known method.

For example, in the multilayer film shown in FIG. 1, a resin film to constitute the substrate layer may be laminated on a biaxially stretched PET film to constitute the innermost layer by using an adhesive agent. Alternatively, the resin to constitute the substrate layer can be laminated by melt extrusion coating without using the adhesive agent.

In the multilayer film shown in FIG. 2, when biaxially stretched films are used for the innermost layer and the outermost layer, a resin to constitute the substrate layer may be laminated on the biaxially stretched film by melt extrusion coating, on which the other biaxially stretched film may be laminated by using an adhesive agent. Alternatively, the biaxially stretched films can be sandwich-laminated with the resin to constitute the substrate layer without using the adhesive agent.

In the multilayer film shown in FIG. 3, the barrier layer may be formed on either the substrate layer or the outermost layer, on which the innermost layer may be laminated by using an adhesive agent. Alternatively, the barrier layer can be formed on the outermost layer formed of a biaxially stretched film, and the outermost layer on which the barrier layer is formed and the innermost layer formed of a biaxially stretched film can be sandwich-laminated with the resin to constitute the substrate layer without using the adhesive agent.

Then, the innermost layer of the thus-formed multilayer film is irradiated with a laser light, so that a site to be heat sealed is amorphized or low-crystallized, thereby forming a heat sealing portion.

The multilayer film shown in each of FIGS. 4 and 5 is obtained by providing the outermost layer with the easy-opening portion and slitting the substrate layer (intermediate layer) in the multilayer film shown in each of FIGS. 2 and 3. This multilayer film can be produced by any of the following methods, though the present invention is not limited thereto. Examples include: preparing a slit film in advance as the substrate layer (intermediate layer), which is then laminated between the biaxially stretched films to constitute the outermost layer and the innermost layer; laminating the outermost layer and the substrate layer (intermediate layer), followed by slitting the substrate layer, which is then laminated with the innermost layer; and laminating a resin to constitute the substrate layer (intermediate layer) on the innermost layer by melt extrusion coating, followed by slitting the substrate layer, which is then laminated with the outermost layer. After preparing the multilayer film, a site to be heat sealed in the innermost layer and a site in which the easy-opening portion is to be formed in the outermost layer are irradiated with a laser light, so that the irradiated sites are amorphized or low-crystallized.

(Packaging Bag)

Figure 6:
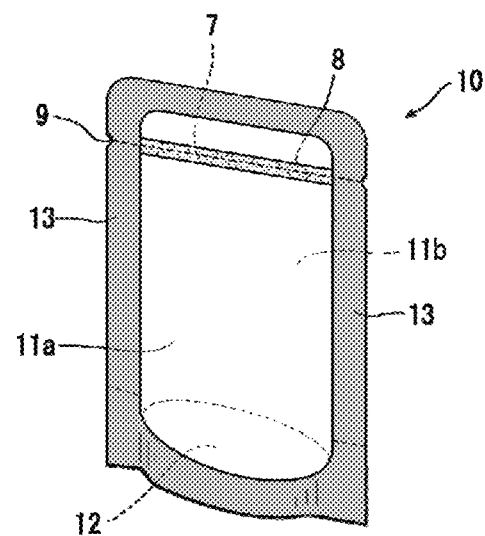
FIG. 6: a perspective view showing an example of the packaging bag of the present invention that is imparted with easy openability.

FIG. 6 is a diagram showing an example of a packaging bag of the present invention. A packaging bag 10 is a standing pouch including a front multilayer film 11a, a back multilayer film 11b, and a two-fold bottom film 12 located between the front multilayer film 11a and the back multilayer film 11b. The rims of the front multilayer film 11a, the back multilayer film 11b, and the bottom film 12 are bonded to one another by a heat seal part 13.

In the packaging bag shown in FIG. 6, a tear part for opening the pouch is formed on top of the pouch. As described above, the tear part includes a slit 7 formed in the intermediate layer of each of the front multilayer film 11a and the back multilayer film 11b, and an easy-opening portion 8 formed in the outermost layer by laser irradiation. The easy-opening portion 8 is formed at a position overlapping the linearly formed slit 7. At the time when the slit 7 is broken, the easy-opening portion 8 is broken simultaneously along the slit 7. At both ends of the heat seal part 13 in the longitudinal direction of the pouch, notches 9 that serve as guides for tearing are formed to lead to the slit 7.

The packaging bag of the present invention can be produced in the following manner. That is, the innermost layers of the above-described multilayer film are opposed to and superposed on each other so that the heat sealing portions match each other, followed by heat sealing using a known heat seal mechanism such as a hot plate, impulse sealing, induction heat sealing, ultrasonic sealing, or high-frequency induction heat sealing.

The shape of the packaging bag is not limited to the form shown in FIG. 6. The packaging bag can take any conventionally known shapes such as a three side seal or four side seal flat bag, a gazette bag, and a pillow bag. It is desirable that the packaging bag is provided with a steam release mechanism that opens automatically during microwave heating.

EXAMPLES (Production of Multilayer Film)

Example 1

A biaxially stretched PBT film having a thickness of 15 μm on which an aluminum oxide vapor deposition layer was formed was prepared as an outermost layer, and a biaxially stretched PET film having a thickness of 12 μm was prepared as an innermost layer. These biaxially stretched films were dry-laminated such that the biaxially stretched PET film was laminated on the aluminum oxide vapor deposition surface by using a polyurethane-based adhesive agent, thereby preparing a multilayer film. In order to cure the polyurethane-based adhesive agent, the thus-prepared multilayer film was then kept in a thermostatic chamber of 35° C. for 5 days for curing.

The surface of the innermost layer of the cured multilayer film was irradiated with a laser beam by using a carbon dioxide gas laser oscillator (wavelength: 10.6 μm) under the following conditions: the output was 35 W; the spot diameter on the irradiated surface was 2.7 mm; the scanning speed was 540 mm/second; and the scanning line interval was 1100 μm. In this manner, a heat sealing multilayer film was produced.

Example 2

A biaxially stretched PET film having a thickness of 12 μm on which an aluminum oxide vapor deposition layer was formed was prepared as an outermost layer. A biaxially stretched PBT film having a thickness of 15 μm was prepared as an intermediate layer, and a biaxially stretched PET film having a thickness of 12 μm was prepared as an innermost layer. These biaxially stretched films were dry-laminated such that the biaxially stretched PBT film was laminated on the aluminum oxide surface by using a polyurethane-based adhesive agent, thereby preparing a multilayer film. The surface of the innermost layer of the multilayer film was irradiated with a laser beam under the same conditions as in Example 1. In this manner, a heat sealing multilayer film was produced.

Example 3

A biaxially stretched PET film having a thickness of 12 μm on which an aluminum oxide vapor deposition layer was formed was prepared as an outermost layer. A biaxially stretched polyester film having a thickness of 15 μm that was obtained by mixing PET and PBT at a weight ratio of 2:8 was prepared as an intermediate layer. A biaxially stretched PET film having a thickness of 12 μm was prepared as an innermost layer. These biaxially stretched films were dry-laminated such that the biaxially stretched polyester film was laminated on the aluminum oxide surface by using a polyurethane-based adhesive agent, thereby preparing a multilayer film. The surface of the innermost layer of the multilayer film was irradiated with a laser beam under the same conditions as in Example 1. In this manner, a heat sealing multilayer film was produced.

Comparative Example 1

A biaxially stretched PET film having a thickness of 12 μm on which an aluminum oxide vapor deposition layer was formed was prepared as an outermost layer. A polyamide film having a thickness of 15 μm was prepared as an intermediate layer, and a polypropylene film having a thickness of 70 μm was prepared as an innermost layer. These films were dry-laminated by using a polyurethane-based adhesive agent, thereby producing a heat sealing multilayer film.

(Production of Packaging Bag)

The innermost layers of the heat sealing multilayer film produced in each of Examples 1 to 3 and Comparative Example 1 were heat sealed, thereby producing a flat pouch having a height of 170 mm and a width of 130 mm.

(Preparation of Food)

Curry sauce was prepared in the following manner. Vegetable oil was heated in a pot, into which minced onions were put to be sauteed until brown, thereby obtaining sauteed onions. Edible oil was heated in another pot, into which flour was put and stirred over low heat for about 1 hour until smooth. When a predetermined temperature (material temperature: roughly 120° C.) was reached, the heat was turned off. Curry powder and spices were added and stirred, thereby obtaining curry roux. The sauteed onions, the curry roux, salt, well-refined sugar, extracts, and seasonings such as chutney were put into a pot with the required amount of water, and heated until a material temperature of 95° C. Water was added further to compensate for the water evaporated by heating during cooking. In this manner, curry sauce was obtained, which was then combined with suitable amounts of precooked beef, potatoes, and carrots. As a result, curry was obtained.

(Production of Packaged Food)

The innermost layers of the heat sealing multilayer film produced in each of Examples 1 to 3 and Comparative Example 1 were heat sealed, thereby producing a flat pouch having a height of 170 mm and a width of 130 mm. The pouch was filled with 180 g of curry and sealed by heat sealing, followed by retort sterilization at 127° C. for 30 minutes, thereby producing packaged food.

Examples and Comparative Example were evaluated as follows.

(Heat Resistance)

The packaged food was subjected to microwave heating at 1700 W for 50 seconds. It was determined whether or not a hole was made in the pouch. A pouch with a hole was expressed by x, and a fine pouch without a hole was expressed by ○.

(Drop Strength)

In accordance with JIS Z0200, the packaged food stored at room temperature was dropped from a height of 80 cm. It was determined whether or not the pouch was broken. A broken pouch was expressed by x, and an unbroken pouch was expressed by ○.

Table 1 shows the evaluation results for heat resistance and drop strength.

TABLE 1

|  | Heat resistance | Drop strength |
|---|---|---|
| Example 1 | ○ | ○ |
| Example 2 | ○ | ○ |
| Example 3 | ○ | ○ |
| Comparative Example 1 | X | ○ |

According to Table 1, the packaging bag obtained in each of Examples 1 to 3 had heat resistance and sufficient drop strength. On the other hand, the packaging bag obtained in Comparative Example 1 had lower heat resistance, so that a hole was made by microwave heating.

Example 4

In a first lamination step, a biaxially stretched PBT film having a thickness of 15 μm that served as an intermediate layer and a biaxially stretched PET film having a thickness of 12 μm that served as an innermost layer were dry-laminated by using a polyurethane-based adhesive agent, thereby preparing a laminated film.

In a slitting step, the laminated film prepared in the first lamination step was slit from the biaxially stretched PBT film side with a rotary cutter, thereby forming a slit as a half-cut.

In a second lamination step, a biaxially stretched PET film having a thickness of 12 µm that served as an outermost layer was dry-laminated on the biaxially stretched PBT film surface of the slit laminated film by using a polyurethane-based adhesive agent, thereby preparing a multilayer film.

Then, in order to cure the polyurethane-based adhesive agent, the thus-prepared multilayer film was kept in a thermostatic chamber of 35° C. for 5 days for curing.

The surface of the biaxially stretched PET film that served as an outermost layer was irradiated with a laser beam along the longitudinal direction of the slit (half-cut) in the multilayer film so that the irradiated position matched the position where the slit was formed, by using a carbon dioxide gas laser oscillator (wavelength: 10.6 µm) under the following conditions: the output was 35 W; the spot diameter on the irradiated surface was 5 mm; and the scanning speed was 540 mm/second. As a result, an easy-opening portion was formed.

Further, the surface of the biaxially stretched PET film that served as an innermost layer was irradiated with a laser beam so that the irradiated position would correspond to a heat seal part of a packaging bag, by using a carbon dioxide gas laser oscillator (wavelength: 10.6 µm) under the following conditions: the output was 35 W; the spot diameter on the irradiated surface was 2.7 mm; the scanning speed was 540 mm/second; and the scanning line interval was 1100 µm.

Comparative Example 2

A multilayer film was produced in the same manner as described in Example 4. In the laser irradiation step, the surface of the biaxially stretched PET film that served as an innermost layer was irradiated with a laser beam so that the irradiated position would correspond to a heat seal part of a packaging bag, by using a carbon dioxide gas laser oscillator (wavelength: 10.6 µm) under the following conditions: the output was 35 W; the spot diameter on the irradiated surface was 2.7 mm; the scanning speed was 540 mm/second; and the scanning line interval was 1100 µm. The surface of the biaxially stretched PET film that served as an outermost layer was not irradiated with a laser beam, so that the easy-opening portion was not formed.
(Production of Packaged Food)

The innermost layers of the multilayer film produced in each of Example 4 and Comparative Example 2 were heat sealed, thereby producing a flat pouch having a height of 170 mm and a width of 130 mm.

The flat pouch was filled with 180 ml of water as contents and sealed at the top of the pouch by heat sealing, followed by retort sterilization at 127° C. for 30 minutes, thereby producing packaged food.

The packaged food after retort sterilization was allowed to reach ordinary temperature and then torn open by hand.

As a result, the pouch using the multilayer film of Example 4 was torn open successfully along the slit (half-cut). On the other hand, as to the pouch using the multilayer film of Comparative Example 2, delamination occurred between the outermost layer film and the intermediate layer film at the point where the pouch was torn open until the tear extends beyond the heat seal part into a contents storage area to a depth of about 20 mm.

INDUSTRIAL APPLICABILITY

The packaging bag of the present invention is excellent in heat resistance, mechanical strength, barrier properties, and impact resistance, and also has excellent contents resistance and flavor properties since biaxially stretched PET is used for the innermost layer. Therefore, the packaging bag of the present invention can suitably contain viscous contents with a large amount of salt and oil content and is suitably adaptable to high-power microwave heating. Further, by using the multilayer film in which the outermost layer and the intermediate layer are provided with the easy-opening portion and the slit, respectively, the packaging bag can be imparted with excellent easy openability.

EXPLANATIONS OF LETTERS OR NUMERALS

1: multilayer film
2: innermost layer
3: substrate layer
4: heat sealing portion
5: outermost layer
6: barrier layer
7: slit
8: easy-opening portion
9: notch
10: pouch
11: multilayer film
12: bottom film
13: heat seal part

The invention claimed is:

1. A packaging bag comprising a polyester-based multilayer film, the multilayer film including at least: an innermost layer formed of a biaxially stretched polyethylene terephthalate film; and a layer formed of a blend of polyethylene terephthalate and polybutylene terephthalate, the multilayer film further including a layer formed of a polyethylene terephthalate film, wherein a blend ratio (mass ratio) of polyethylene terephthalate to polybutylene terephthalate in the blend is in a range of 10:90 to 90:10;
the layer formed of the blend of polyethylene terephthalate and polybutylene terephthalate has a thickness of 5 to 50 um;
the innermost layer has a thickness of 5 to 50 µm;
the multilayer film as a whole has a thickness of 20 to 100 µm;
the biaxially stretched polyethylene terephthalate film has a heat sealing portion that is amorphized or low-crystallized by laser light irradiation under conditions including each of: an output of 10 to 400 W; a spot diameter of 0.14 to 15 nmmm; a scanning line interval of 0.05 to 15 mm; and an irradiation energy density of 0.5 to 8 J/cm$^2$, and the packaging bag is formed by: allowing the innermost layers of the polyester-based multilayer film to be opposed to and superimposed on each other; and heat sealing the heat sealing portions; and
the layer formed of a polyethylene terephthalate film is an outermost layer that is formed of a biaxially stretched polyethylene terephthalate and has an easy-opening portion that is amorphized or low-crystallized by laser light irradiation under conditions including each of: an output of 10 to 400 W; a spot diameter of 0.14 to 15 mm; a scanning line interval of 0.05 to 15 mm; and an irradiation energy density of 0.5 to 8 J/cm$^2$, and an intermediate layer located between the outermost layer and the innermost layer has a slit.

2. The packaging bag according to claim 1, wherein in the multilayer film, a position where the slit is formed matches a position where the easy-opening portion is formed.

3. The packaging bag according to claim 1, wherein the intermediate layer is formed of polybutylene terephthalate and/or polyethylene terephthalate.

4. The packaging bag according to claim 1, wherein either of the layers except for the innermost layer is a film on which an inorganic vapor deposition layer or a barrier coating layer is formed.

5. The packaging bag according to claim 1, wherein the polyester-based multilayer film has a layer configuration in which an outer layer formed of a polyethylene terephthalate film/a vapor deposition layer or a barrier coating layer/an intermediate layer formed of a blend of polyethylene terephthalate and polybutylene terephthalate/and the innermost layer formed of a biaxially stretched polyethylene terephthalate film are laminated in order from the outer layer.

6. The packaging bag according to claim 1, wherein the polyester-based multilayer film has a layer configuration in which an outer layer formed of a blend of polyethylene terephthalate and polybutylene terephthalate/a vapor deposition layer or a barrier coating layer/an intermediate layer formed of a polyethylene terephthalate film or a blend of polyethylene terephthalate and polybutylene terephthalate/ and the innermost layer formed of a biaxially stretched polyethylene terephthalate film are laminated in order from the outer layer.

7. The packaging bag according to claim 1, wherein the polyester-based multilayer film has a layer configuration in which an outer layer formed of a polybutylene terephthalate film/a vapor deposition layer or a barrier coating layer/an intermediate layer formed of a blend of polyethylene terephthalate and polybutylene terephthalate/and the innermost layer formed of a biaxially stretched polyethylene terephthalate film are laminated in order from the outer layer.

* * * * *